(12) United States Patent
Chen

(10) Patent No.: US 6,293,672 B1
(45) Date of Patent: Sep. 25, 2001

(54) CLIP-ON GLASSES

(76) Inventor: Lee-Tsung Chen, No. 14, Lane 296, Yeong-Gong Rd., Shyh-Lin, Taipei (TW)

( * ) Notice: Subject to any disclaimer, the term of this patent is extended or adjusted under 35 U.S.C. 154(b) by 0 days.

(21) Appl. No.: 09/692,828

(22) Filed: Oct. 18, 2000

(51) Int. Cl.⁷ .................................. G02C 9/00; G02C 7/08
(52) U.S. Cl. .................................................. 351/47; 351/57
(58) Field of Search .................................. 351/47, 48, 57, 351/58

(56) References Cited

U.S. PATENT DOCUMENTS

| | | | | |
|---|---|---|---|---|
| 3,876,295 | * | 4/1975 | Loughner | 351/47 |
| 5,980,036 | * | 11/1999 | Solomon | 351/47 |
| 6,012,811 | * | 1/2000 | Chao et al. | 351/47 |

* cited by examiner

*Primary Examiner*—Huy Mai
(74) *Attorney, Agent, or Firm*—Pro-Techtor International Services

(57) ABSTRACT

A pair of clip-on glasses including at least two lenses and a bridge connecting the two lenses to each other is provided. The bridge is provided at a back side with two upper and lower clips, each of the two clips is provided at an inner side near a rear edge thereof with at least one magnet to normally magnetically attract the two clips to contact with each other. At least one of the two clips is pivotally movable relative to another clip to facilitate easy separation of the two magnetically contacted clips from each other. The clip-on glasses could be firmly connected to a front of a pair of regular glasses by clamping a bridge of the regular glasses between the upper and lower clips behind the bridge of the clip-on glasses and by closing the upper and lower clips with the mutually attracted magnets to enclose the bridge of the regular glasses in the closed upper and lower clips of the clip-on glasses. The clip-on glasses may be connected to all types of glasses, including rimless glasses.

12 Claims, 5 Drawing Sheets

CLIP-ON GLASSES

BACKGROUND OF THE INVENTION

The present invention relates to clip-on glasses, and more particularly to clip-on glasses that are adapted to connect to a front of regular glasses, including rimless glasses.

The connection of a pair of additional glasses to the front of another pair of regular glasses is currently popular among young men because lenses of the additionally connected glasses may have a design different from that of the regular glasses to easily change the appearance and/or function of the regular glasses.

FIG. 1 shows a pair of conventional glasses 2 for additionally connected to the front of a pair of regular glasses 1. For the glasses 2 to connected to the regular glasses 1, two magnets 12 are separately set in and flush with a front of the regular glasses 1 near two outer sides of two rims 11 of the glasses 1, and two connecting arms 21 are separately extended from two sides of the additional glasses 2 with two magnets 22 separately set in and flushing with rear surfaces of the connecting arms 21. By positioning the additional glasses 2 in front of the regular glasses 1 and aligning the magnets 22 on the connecting arms 21 with the magnets 12 at two outer sides of the rims 11, the magnets 12 and 22 attract one another to associate the glasses 1 with the glasses 2.

The above-described structure for connecting the additional glasses 2 to the regular glasses 1 has the following disadvantages that need to be improved:

1. Since the magnets 12 are flush with the front of the regular glasses 1 and the magnets 22 are flush with rear surfaces of the connecting arms 21 of the additional glasses 2, the glasses 1, 2 are simply magnetically connected to each other through the flat contact of the magnets 12 with the magnets 22. The two pairs of glasses 1, 2 tend to separate from each other under an external force adversely applied on the glasses.
2. The additional glasses 2 are connected to the regular glasses 1 through the two pairs of flatly contacted magnets 12 and 22. In the event two temples 13 of the regular glasses 1 are outward stretched or otherwise deformed when the glasses 1 are worn by a user, it is possible a distance between the two magnets 12 changes to cause disalignment of the magnets 12 and 22 from one another, and accordingly, undesired separation of the additional glasses 2 from the regular glasses 1.
3. For the magnets 12, 22 to be set in and flush with the front of the glasses 1 and the rear surface of the glasses 2, respectively, the glasses 1, 2 must have frames of a certain thickness large enough to receive the magnets 12, 22, and the shape of portions of the glasses 1, 2 at where they contact with one another must be flat. All these conditions largely restrict the design of the glasses 2 to only very narrow scope, making the glasses 1 and 2 heavy and monotonous in appearance.
4. The above-mentioned additional glasses 2 could not be used with rimless glasses that have lenses directly connected to temples of the glasses. As mentioned above, the temples tend to deform when the glasses are worn by a user and easily cause disalignment of the magnets 12 and 22 from one another.

It is therefore tried by the inventor to develop improved glasses for additionally connected to regular glasses in a very simple but reliable manner to eliminate the above-mentioned drawbacks.

SUMMARY OF THE INVENTION

A primary object of the present invention is to provide a pair of clip-on glasses that could be easily and reliably connected to a front of a pair of regular glasses without the risk of easily separating from the regular glasses.

Another object of the present invention is to provide a pair of clip-on glasses that could be connected to a front of a pair of regular glasses having any type of frame, including rimless glasses.

To achieve the above and other objects, the clip-on glasses of the present invention mainly include at least two rimmed or rimless lenses and a bridge connecting the two lenses to each other. The bridge is provided at a back side with upper and lower clips, each of the two clips is provided at an inner side near a rear edge thereof with at least one magnet to normally magnetically attract the two clips to contact with each other at the rear edges. At least one of the two clips is pivotally movable relative to another clip to facilitate easy separation of the two magnetically contacted clips from each other. The clip-on glasses could be firmly connected to a front of a pair of regular glasses by clamping a bridge of the regular glasses between the upper and lower clips behind the bridge of the clip-on glasses and by closing the upper and lower clips with the mutually attracted magnets to enclose the bridge of the regular glasses in the closed upper and lower clips of the clip-on glasses. The clip-on glasses may be connected to all types of glasses, including rimless glasses.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
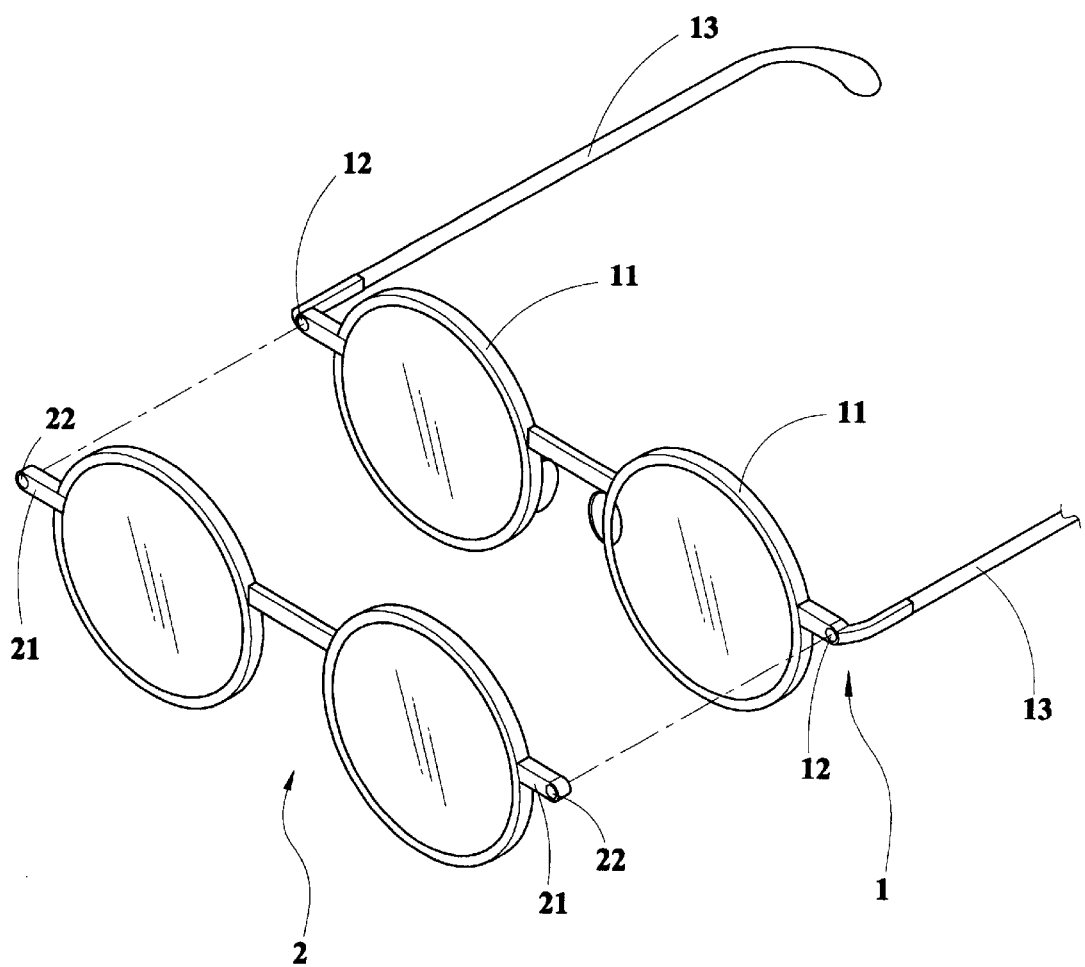
FIG. 1 is an exploded perspective showing the conventional manner of connecting an additional pair of glasses to a pair of regular glasses.
Figure 2:
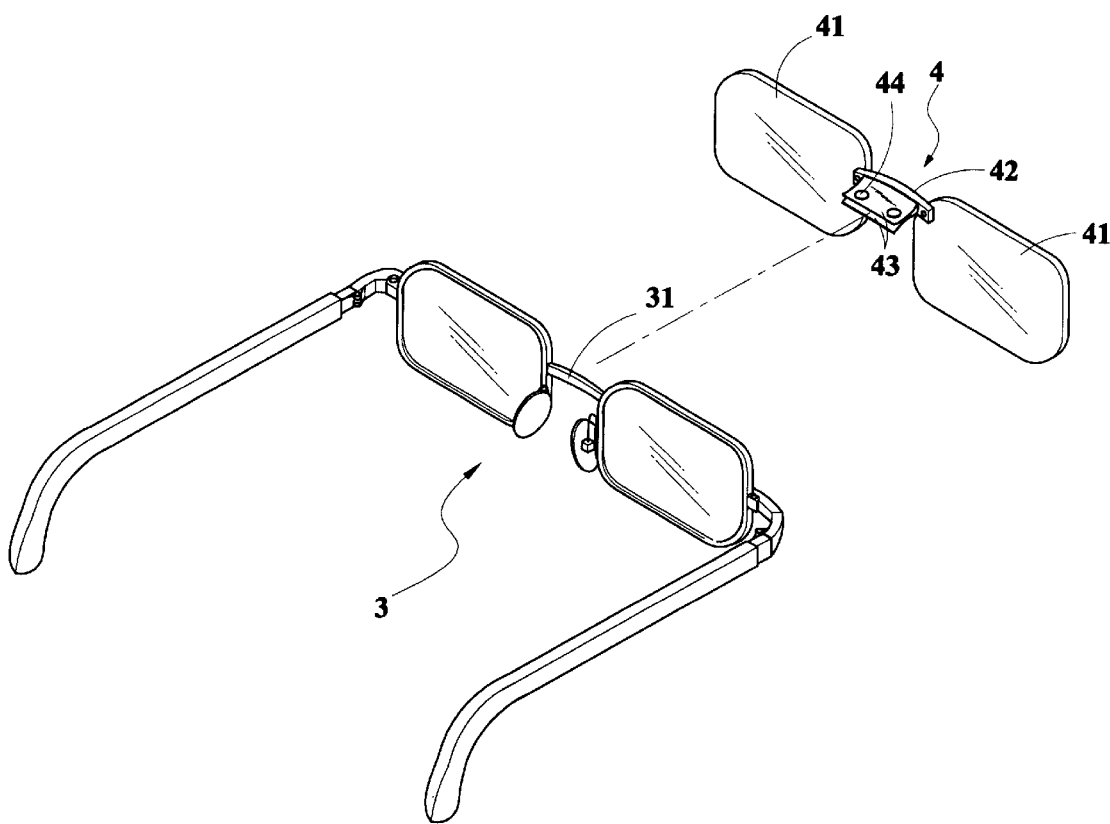
FIG. 2 is a perspective showing a pair of clip-on glasses according to the present invention before being clipped on a pair of regular glasses.
Figure 3:
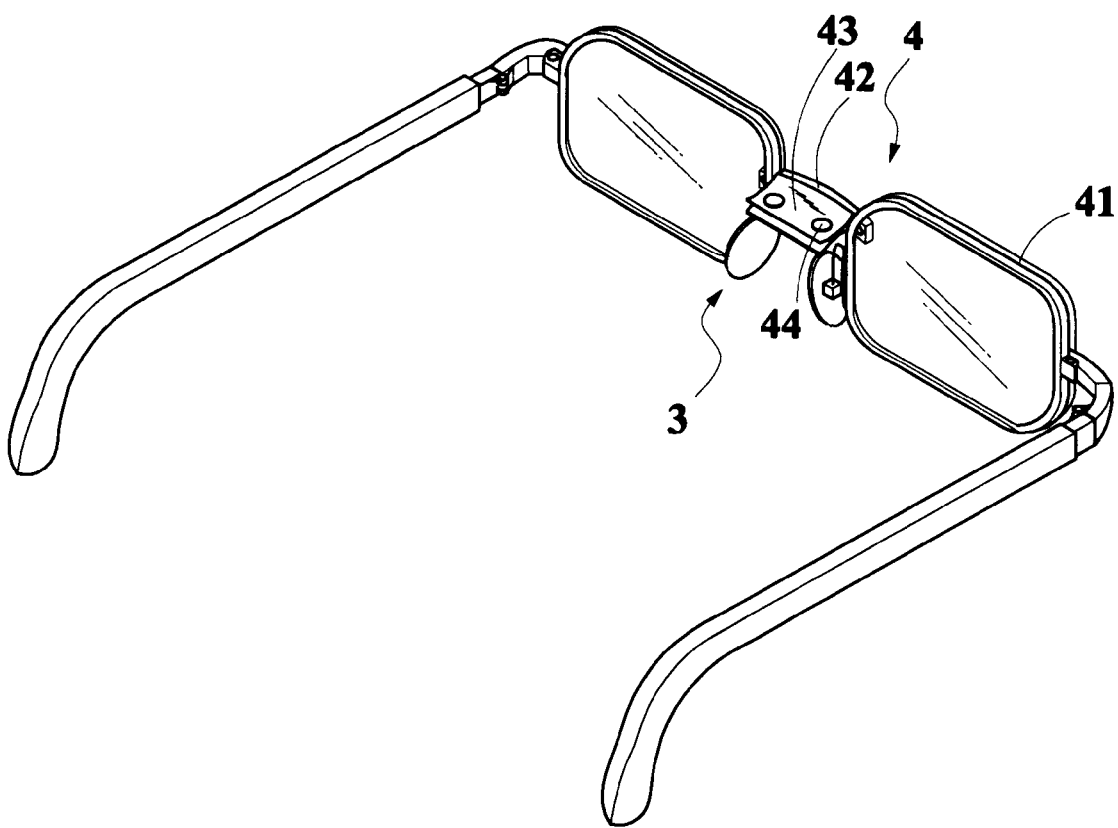
FIG. 3 is a perspective showing the clip-on glasses of FIG. 2 having been clipped on the regular glasses.
Figure 4:
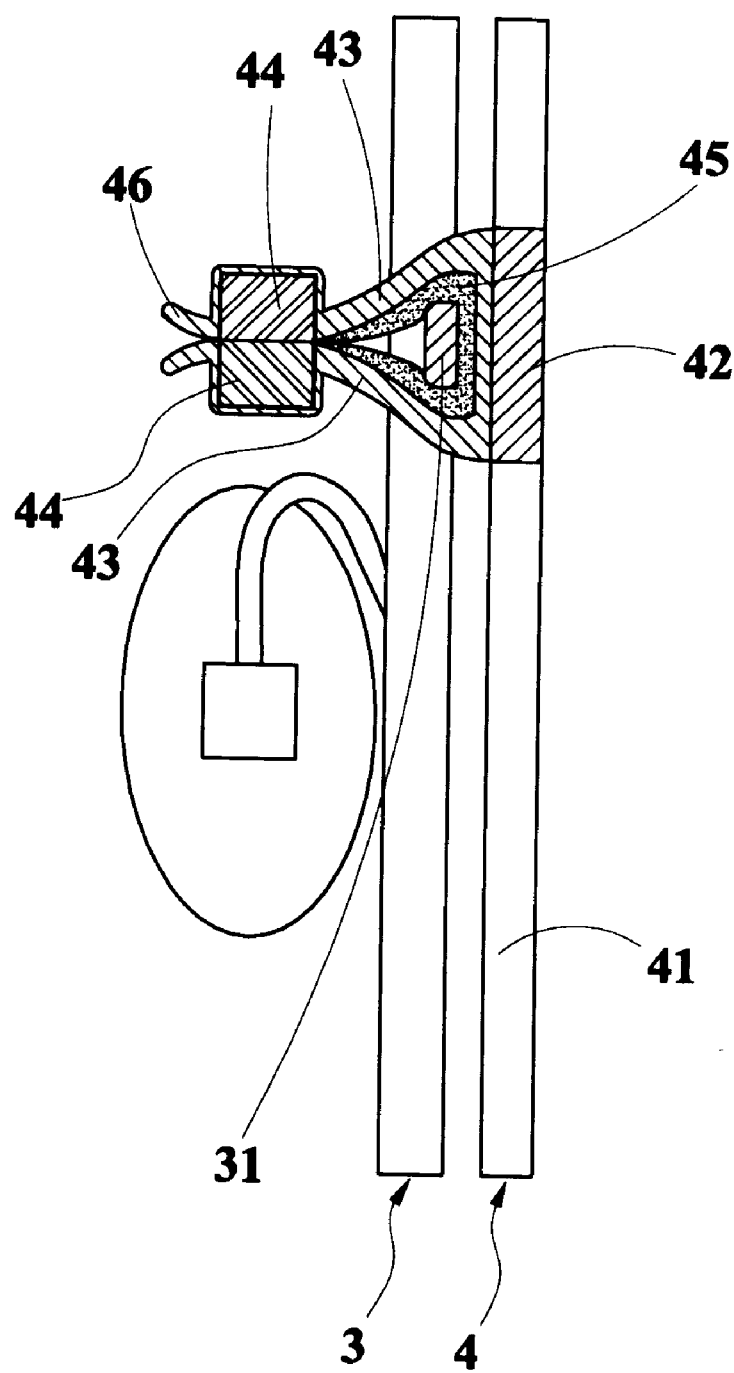
FIG. 4 is a side sectional view of FIG. 3.

Please refer to FIGS. 2 to 4 in which a pair of clip-on glasses 4 according to an embodiment of the present invention is shown. The clip-on glasses 4 include at least a pair of rimless lenses 41 and abridge 42 connecting the two lenses 41 to each other. The bridge 42 is provided at a back side with two spaced and substantially horizontally extended clips 43, namely, an upper clip and a lower clip. Each of the two clips 43 is provided at an inner side near two outer corners thereof with two magnets 44, so that the two clips 43 are normally magnetically attracted to contact with each other. At least one of the two clips 43 is pivotally movable relative to another clip 43. As can be clearly seen from FIG. 4, the two clips 43 have outward inclined rear edges 46, and a cushion 45 made of a suitable soft material, such as silicon rubber, covers inner sides of the two clips 43 and the back side of the bridge 42.

The clip-on glasses 4 are designed for conveniently mounting to a front of a pair of regular glasses 3. To do so, simply use the two clips 43 to clamp a bridge 3 of the regular glasses 3, such that the bridge 3 is located between the two clips 43 immediately behind the bridge 42. After the bridge 3 has moved into place behind the bridge 42, the magnets 44 mounted on the two clips 43 automatically attract one another to close rear edges of the two clips 43 and thereby firmly hold the clip-on glasses 4 to the front of the regular glasses 3 without the risk of becoming loosened therefrom due to an external force applied on the clip-on glasses 4.

It is understood the clip-on glasses 4 are not necessarily formed from two rimless lenses 41 and the bridge 42. The clip-on glasses 4 may also include two rimmed lenses and a bridge just like any regular glasses available in the market.

Figure 5:
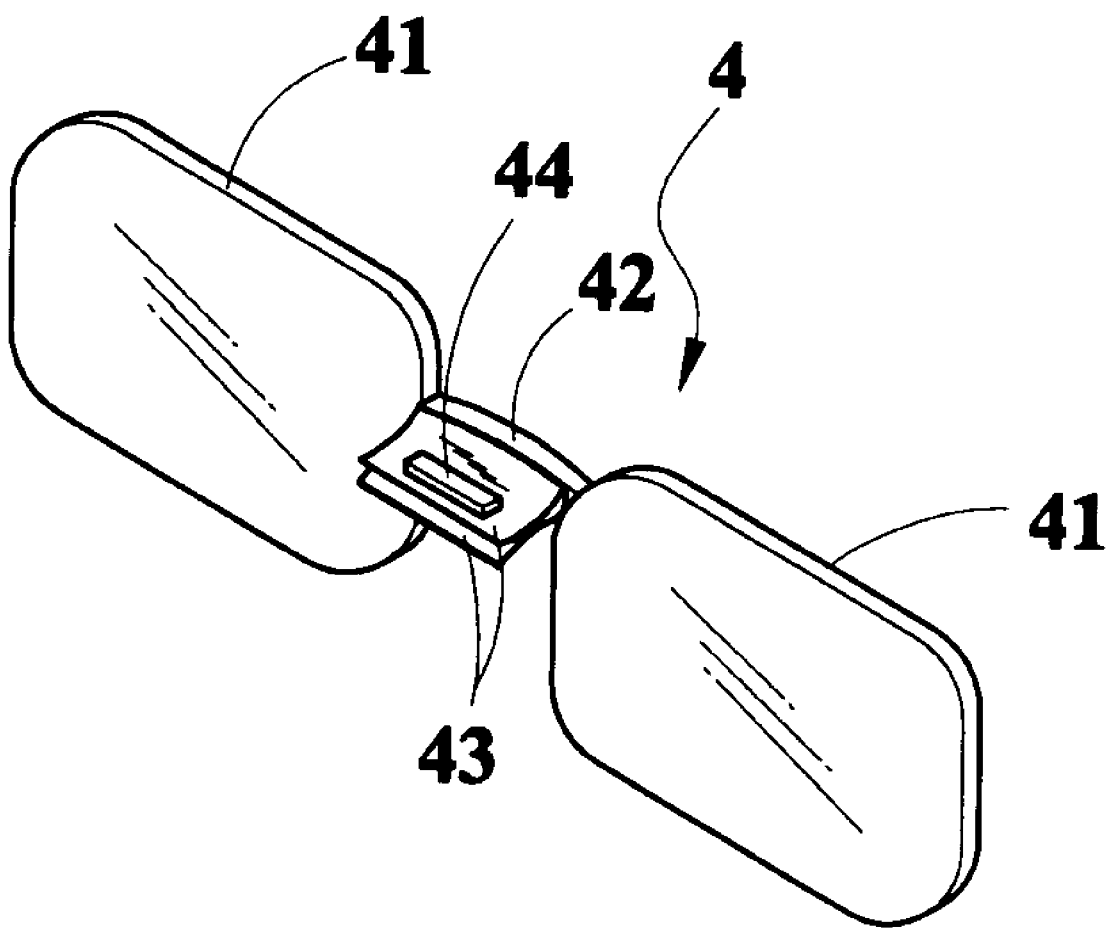
FIG. 5 is a perspective showing a pair of clip-on glasses according to another embodiment of the present invention.

Meanwhile, the magnets 44 are not necessarily located at outer corners of inner sides of the two clips 43. FIG. 5 shows another embodiment of the present invention in which only two magnets 44 are separately mounted at inner sides of the two clips 43 near rear central portions thereof to provide the same well clamping effect to hold the clip-on glasses 4 to the regular glasses 3.

The purpose of the soft cushion 45 is to provide good buffer between the two bridges 42 and 31 that are usually made of rigid materials, so that the bridge 31 is not easily abraded or otherwise damaged due to contact with the bridge 42. The cushion 45 also allows firm and stable location of the bridge 31 between the two clips 43.

The outward inclined rear edges 46 of the two clips 43 are provided to facilitate easy separation of the two magnetically connected clips 43 at the outward inclined rear edges 46. The outward inclined rear edges 46 of the clips 43 also convenient mounting of the clip-on glasses 4 onto the regular glasses 3 simply by aligning the outward inclined rear edges 46 of the clips 43 behind the bridge 42 with the bridge 31 and pushing the bridge 42 against the bridge 31 for the latter to move into a space between the two clips 43 easily.

The clips 43 may be integrally formed with the bridge 42 of the clip-on glasses 4 or additionally connected to the bridge 42 by way of, for example, welding, depending on the material adopted for making the bridge 42 and the clips 43.

The following are some of the advantages of the clip-on glasses of the present invention:

1. The clip-on glasses 4 are located in front of the regular glasses 3 by clamping the bridge 31 of the regular glasses 3 between the two clips 43 backward extended from the bridge 42 of the clip-on glasses 4 and by closing rear edges of the two clips 43 with magnetically attracted magnets 44 mounted at inner sides of the clips 43 to enclose the bridge 31 of the regular glasses 3 in the closed clips 43. Thus, the clip-on glasses 4 are stably associated with the regular glasses 3 without the risk of easily loosening from the latter.
2. The clip-on glasses 4 and the regular glasses 3 are firmly connected to each other at their bridges 42 and 31, respectively. Such firm connection would not be adversely affected by any expansion or stretch of two temples of the regular glasses 3 when the same are worn by a user. That is, the clip-on glasses 4 are not subject to undesired separation from the regular glasses 3 due to any deformation of the temples of the regular glasses 3.
3. The clip-on glasses 4 have very simple structure that allows the glasses 4 to clip on the regular glasses 3 without the need of changing or modifying the existing shape or configuration of the regular glasses 3. Moreover, the clips 43 may be so designed that they are adapted to clamp bridges 31 of different heights and shapes. Therefore, the lenses 41, either rimmed or rimless, are allowed to have many different designs to give the clip-on glasses 4 changeful appearances.
4. The clip-on glasses 4 of the present invention may be used with glasses having different types of frames, including rimless glasses.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A pair of clip-on glasses, comprising at least two rimless lenses and a bridge connecting said two rimless lenses to each other; said clip-on glasses being characterized in that said bridge is provided at a back side with two spaced and substantially horizontally extended upper and lower clips, each of said two clips being provided at an inner side near a rear edge thereof with at least one magnetic body to normally magnetically attract said two clips to contact with each other, and at least one of said two clips being pivotally movable relative to another said clip to facilitate easy separating of said two magnetically contacted clips from each other; whereby said clip-on glasses could be firmly connected to a front of a pair of regular glasses by clamping a bridge of said regular glasses between said upper and lower clips behind said bridge of said clip-on glasses and by closing said upper and lower clips with said mutually attracted magnetic bodies to enclose said bridge of said regular glasses in said closed upper and lower clips of said clip-on glasses.

2. A pair of clip-on glasses as claimed in claim 1, wherein said magnetic bodies are separately located at central portions at inner sides of said clips near said rear edges.

3. A pair of clip-on glasses as claimed in claim 1, wherein said magnetic bodies are separately located at two corners at inner side of said clips near said rear edges.

4. A pair of clip-on glasses as claimed in claim 1, further comprising a soft cushion to cover said inner sides of said two clips and said back side of said bridge.

5. A pair of clip-on glasses as claimed in claim 4, wherein said soft cushion is made of silicon rubber.

6. A pair of clip-on glasses as claimed in claim 1, wherein said upper clip and said lower clip are provided at said rear edges with outward inclined end portions.

7. A pair of clip-on glasses, comprising at least two rimmed lenses and a bridge connecting said two rimmed lenses to each other; said clip-on glasses being characterized in that said bridge is provided at a back side with two spaced and substantially horizontally extended upper and lower clips, each of said two clips being provided at an inner side near a rear edge thereof with at least one magnetic body to normally magnetically attract said two clips to contact with each other, and at least one of said two clips being pivotally movable relative to another said clip to facilitate easy separating of said two magnetically contacted clips from each other; whereby said clip-on glasses could be firmly connected to a front of a pair of regular glasses by clamping a bridge of said regular glasses between said upper and lower clips behind said bridge of said clip-on glasses and by closing said upper and lower clips with said mutually attracted magnetic bodies to enclose said bridge of said regular glasses in said closed upper and lower clips of said clip-on glasses.

8. A pair of clip-on glasses as claimed in claim 7, wherein said magnetic bodies are separately located at central portions at inner sides of said clips near said rear edges.

9. A pair of clip-on glasses as claimed in claim 7, wherein said magnetic bodies are separately located at two corners at inner side of said clips near said rear edges.

10. A pair of clip-on glasses as claimed in claim 7, further comprising a soft cushion to cover said inner sides of said two clips and said back side of said bridge.

11. A pair of clip-on glasses as claimed in claim 10, wherein said soft cushion is made of silicon rubber.

12. A pair of clip-on glasses as claimed in claim 7, wherein said upper clip and said lower clip are provided at said rear edges with outward inclined end portions.

\* \* \* \* \*